(12) United States Patent
Boyd et al.

(10) Patent No.: US 9,671,023 B2
(45) Date of Patent: Jun. 6, 2017

(54) SPACER AND GASKET ASSEMBLY FOR USE ON AN AIRCRAFT

(71) Applicant: AVIATION DEVICES & ELECTRONIC COMPONENTS, LLC, Fort Worth, TX (US)

(72) Inventors: Matt Boyd, Fort Worth, TX (US); David Schmidt, Egg Harbor Township, NJ (US); Jeff Busby, Millsap, TX (US)

(73) Assignee: Aviation Devices & Electronic Components, LLC, Fort Worth, TX (US)

( * ) Notice: Subject to any disclaimer, the term of this patent is extended or adjusted under 35 U.S.C. 154(b) by 0 days.

(21) Appl. No.: 14/698,416

(22) Filed: Apr. 28, 2015

(65) Prior Publication Data

US 2015/0252903 A1   Sep. 10, 2015

Related U.S. Application Data

(63) Continuation-in-part of application No. 14/264,216, filed on Apr. 29, 2014, which is a continuation-in-part
(Continued)

(51) Int. Cl.
*B29C 65/00* (2006.01)
*F16J 15/06* (2006.01)
(Continued)

(52) U.S. Cl.
CPC .............. *F16J 15/061* (2013.01); *B64C 1/18* (2013.01); *F16J 15/104* (2013.01); *F16J 15/122* (2013.01);
(Continued)

(58) Field of Classification Search
CPC ............................. F16J 15/328; F01D 11/005
See application file for complete search history.

(56) References Cited

U.S. PATENT DOCUMENTS

| | | |
|---|---|---|
| 1,851,948 A | 3/1932 | Summers |
| 2,092,393 A | 9/1937 | Hewitt |

(Continued)

FOREIGN PATENT DOCUMENTS

| | | |
|---|---|---|
| DE | 3720224 A1 | 1/1989 |
| JP | 09109346 A | 4/1997 |
| WO | 2005030893 | 4/2005 |

OTHER PUBLICATIONS

PCT International Search Report, PCT/US2015/027985, Aviation Devices & Electronic Components, LLC, 9 pages Jul. 22, 2015.
(Continued)

*Primary Examiner* — Kristina Fulton
*Assistant Examiner* — Eugene G Byrd
(74) *Attorney, Agent, or Firm* — Jackson Walker, LLP

(57) ABSTRACT

A spacer and gasket assembly is shown for receipt between a static structure having a surface and fastener holes therethrough and a removable structure having a surface and fastener holes. The static structure and removable structure are engaged through a multiplicity of fasteners having a shaft diameter. The fasteners are adapted to apply a compression on the gasket between the static structure and the removable structure. The static structure and the removable structure have opposed, typically flat, facing surfaces. The spacer and gasket assembly comprising a substantially non-compressible spacer adapted for receipt between the static structure and the removable structure having a spacer thickness. A gasket has a sticky, deformable, flowable, elastomeric body and a skeleton having a skeleton thickness, the skeleton substantially integral with the body. The gasket has an uncompressed gasket thickness. The spacer and the gasket are adapted to be placed substantially between the facing walls of the static structure and the removable struc-
(Continued)

ture and the removable structure will compress and deform the gasket when the fasteners are torqued down.

20 Claims, 14 Drawing Sheets

Related U.S. Application Data of application No. 13/793,533, filed on Mar. 11, 2013, now Pat. No. 9,016,697.

(60) Provisional application No. 61/669,957, filed on Jul. 10, 2012.

(51) Int. Cl.
| | |
|---|---|
| *B64C 1/18* | (2006.01) |
| *F16J 15/10* | (2006.01) |
| *F16J 15/12* | (2006.01) |
| *F16J 15/14* | (2006.01) |
| *H01Q 1/28* | (2006.01) |

(52) U.S. Cl.
CPC .............. *F16J 15/127* (2013.01); *F16J 15/14* (2013.01); *H01Q 1/283* (2013.01); *Y10T 29/49622* (2015.01)

(56) References Cited

U.S. PATENT DOCUMENTS

| | | | |
|---|---|---|---|
| 2,772,903 A * | 12/1956 | Sussenbach | F16B 43/001 277/650 |
| 3,195,906 A | 7/1965 | Moyers | |
| 3,473,813 A | 10/1969 | Meyers | |
| 3,532,349 A | 10/1970 | Czernik | |
| 3,555,168 A | 1/1971 | Frykberg | |
| 3,610,809 A | 10/1971 | Eigenbrod | |
| 3,655,210 A | 4/1972 | Farnam et al. | |
| 3,681,272 A | 8/1972 | Gloskey | |
| 3,863,936 A | 2/1975 | Farnam | |
| 3,993,833 A | 11/1976 | Esmay | |
| 4,090,988 A | 5/1978 | Babiec | |
| 4,183,699 A | 1/1980 | Donan | |
| 4,204,691 A | 5/1980 | Makino | |
| 4,247,737 A * | 1/1981 | Johnson | H05K 9/00 174/389 |
| 4,305,696 A | 12/1981 | Pask | |
| 4,325,280 A | 4/1982 | Hardy | |
| 4,530,443 A | 7/1985 | Gorges | |
| 4,544,169 A | 10/1985 | Cobb | |
| 4,635,949 A | 1/1987 | Lucas | |
| 4,835,060 A | 5/1989 | Kosiarski | |
| 4,900,629 A | 2/1990 | Pitolaj | |
| 4,900,877 A * | 2/1990 | Dubrow | H05K 9/0015 174/351 |
| RE33,392 E | 10/1990 | Brauer | |
| 5,037,879 A | 8/1991 | Roberts | |
| 5,054,793 A | 10/1991 | Hauenstein | |
| 5,158,638 A | 10/1992 | Osanami | |
| 5,512,709 A | 4/1996 | Jencks et al. | |
| 5,702,111 A | 12/1997 | Smith | |
| 5,890,719 A | 4/1999 | Bettencourt | |
| 6,056,526 A | 5/2000 | Sato | |
| 6,121,545 A | 9/2000 | Peng | |
| 6,312,022 B1 | 11/2001 | Brophy, III et al. | |
| 6,346,330 B1 | 2/2002 | Huang et al. | |
| 6,364,976 B2 | 4/2002 | Fletemier | |
| 6,365,812 B1 | 4/2002 | McGill | |
| 6,403,226 B1 | 6/2002 | Biernath et al. | |
| 6,460,859 B1 | 10/2002 | Hammi et al. | |
| 6,530,577 B1 | 3/2003 | Busby | |
| 6,553,664 B1 | 4/2003 | Schenk | |
| 6,582,172 B2 * | 6/2003 | Nickerson | F16B 5/02 277/598 |
| 6,598,883 B1 | 7/2003 | Hammi et al. | |
| 6,695,320 B2 | 2/2004 | Busby | |
| 7,229,516 B2 | 6/2007 | Busby | |
| 7,290,769 B2 | 11/2007 | Piona | |
| 7,654,538 B2 | 2/2010 | Oka | |
| 8,240,040 B2 | 8/2012 | Miyamoto et al. | |
| 9,016,697 B2 | 4/2015 | Boyd et al. | |
| 2001/0001684 A1 | 5/2001 | Sylvester | |
| 2002/0135137 A1 | 9/2002 | Hammi | |
| 2004/0070156 A1 | 4/2004 | Smith | |
| 2005/0023768 A1 | 2/2005 | Adams | |
| 2005/0140098 A1 * | 6/2005 | Etling | B64C 1/12 277/630 |
| 2009/0322040 A1 | 12/2009 | Banba | |
| 2010/0101198 A1 * | 4/2010 | Phillips | B08B 15/02 55/385.2 |
| 2010/0258200 A1 | 10/2010 | Walker | |
| 2011/0156353 A1 | 6/2011 | Kabutoya et al. | |
| 2012/0049466 A1 * | 3/2012 | Nikolin | F16J 15/061 277/637 |
| 2013/0273342 A1 | 10/2013 | Johnson et al. | |
| 2013/0280010 A1 * | 10/2013 | Fujii | E04D 1/34 411/371.1 |
| 2014/0015204 A1 | 1/2014 | Boyd et al. | |
| 2014/0334868 A1 | 11/2014 | Apfel | |

OTHER PUBLICATIONS

"Conductive Elastomer Gasket Design," Chomerics, www.chomerics.com, pp. 1-9 Jan. 1, 2011.
"Technical Data Sheet," PN# 1500101130CR, VTT/Shieldex Trading USA, www.shieldextrading.net/product_INDEX.html, 9 pages Jan. 20, 2010.
Tecknit, EMI Shielding Products, Mesh & Elastomer Combination Gaskets, www.tecknit.com/meshelas.html Aug. 31, 2012.
Tecknit, EMI Shielding Products, Oriented Wire Mesh Strip & Gasket Material, www.tecknit.com/orient.html Aug. 31, 2012.
Tecknit, EMI Shielding Products, Conductive Silicone Elastomers, www.tecknit.com/silelast.html Aug. 31, 2012.
Loos & Co., Inc., Knitted Wire Mesh, www.loosco.com/index.php?page=knitted-wire-mesh, 3 pages Dec. 7, 2012.
European Search Report, Application No. 132765161.1-1751, 7 pages Jun. 11, 2013.

* cited by examiner

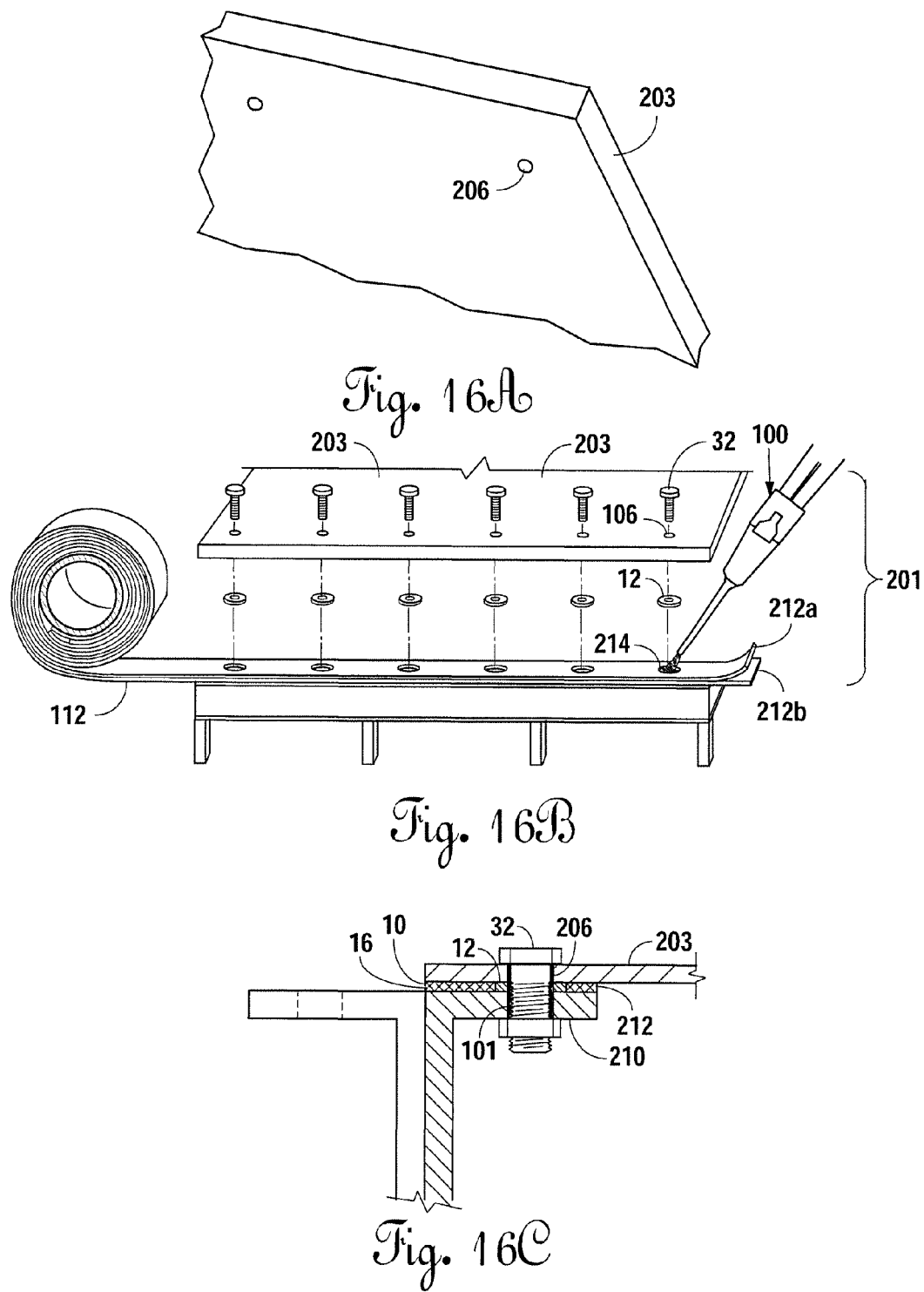

SPACER AND GASKET ASSEMBLY FOR USE ON AN AIRCRAFT

This continuation-in-part application claims priority to, benefit of, and incorporates herein by reference, U.S. patent application Ser. No. 14/264,216, filed Apr. 29, 2014; which claims the benefit of U.S. patent application Ser. No. 13/793,533, filed Mar. 11, 2013; and U.S. Provisional Application Ser. No. 61/669,957, filed Jul. 10, 2012. All of the foregoing are incorporated by reference.

FIELD OF THE INVENTION

Multi-component aircraft assemblies and, more particularly, to a spacer and gasket assembly for an interposition under compression between a static structure of an aircraft and a removable structure of an aircraft.

BACKGROUND OF THE INVENTION

The use of gaskets for environmental sealing in aircraft, especially the outside of an aircraft, has some unique challenges. In its lifetime, an aircraft will undergo environmental extremes, pressures ranging from those typically found at sea level to the extremely air pressures found at 40,000-50,000 feet. Temperature ranges are also subject to extremes, as are humidity conditions and pressure differentials across a gasket.

Given such a radical and extreme environment, environmental seals, such as gaskets and gasket assemblies, especially those adapted for use on an aircraft exterior, must often have unique properties. Furthermore, the gaskets sometimes must be adapted to be conductive or nonconductive between the pieces that they join, depending upon their application. Furthermore, potential reactivity with the aircraft structures to which they engage is yet another consideration.

SUMMARY OF THE INVENTIONS

In one embodiment, a spacer and gasket assembly for receipt between a static structure having an outer and inner surface and fastener holes therethrough and a removable structure having a base with fastener holes and an upper surface and a lower surface, the static structure and removable structure typically being engaged through a multiplicity of fasteners adapted to apply a compression on the gasket between the static structure and the removable structure, the spacer and gasket assembly. The assembly comprises a substantially non-compressible spacer adapted for receipt between the static structure, and the removable structure having a spacer thickness; and a compressible gasket having a sticky, deformable, flowable (under compression) elastomeric body (sometimes a gel) and a skeleton, substantially enclosed with the body. The spacer and the gasket are placed between the static structure and the removable structure and the fasteners torqued to a preselected value or until the spacer "bottoms" out against the skeleton and the faying surfaces of the static and removable structures, where a spike in torque resistance will be encountered.

A spacer and gasket assembly for receipt between a static structure having a surface and fastener holes therethrough and a removable structure having a surface with fastener holes, the spacer and gasket assembly comprising: a substantially non-compressible spacer having a spacer thickness; and a gasket having a sticky, deformable, pliable, elastomeric body, the gasket having an uncompressed gasket thickness greater than the spacer thickness; and a multiplicity of fasteners having a shaft with a shaft diameter, the fasteners adapted to apply a compression on the spacer and the gasket between the static structure and the removable structure; wherein a sticky, elastomeric gel, applied at the time the fasteners are entrained, coats at least part of some of the multiplicity of fasteners.

In one embodiment of the invention set forth in the preceding paragraph, the gasket includes a skeleton and the spacer and the gasket are stacked such that upon compression, the spacer is encapsulated in the elastomeric body. The gasket may include a skeleton and the spacer and the gasket may be placed side-by-side. The body of the gasket may be comprised of a cured polyurethane and may be tabular shape. The gasket may include fastener holes. It's compressed thickness is typically, in one embodiment, about 40 to 80% of its uncompressed thickness.

A spacer and gasket assembly for receipt between a static structure having a surface and fastener holes therethrough and a removable structure having a surface with fastener holes, the static structure and removable structure being engaged through a multiplicity of fasteners, the fasteners adapted to apply a compression between the static structure and the removable structure, the static structure and the removeable structure having opposed, generally flat, facing surfaces, the spacer and gasket assembly comprising: a substantially non-compressible spacer adapted for receipt between the static structure and the removable structure, the spacer having a spacer thickness; and a gasket having a sticky, deformable, pliable, elastomeric body without a skeleton, the gasket having an uncompressed gasket thickness; wherein spacer and the gasket are adapted to be placed under compression between the facing surfaces of the static structure and the removable structure.

A spacer and gasket assembly for receipt between a static structure having a surface and fastener holes therethrough and a removable structure having a surface with fastener holes, the static structure and removable structure being engaged through a multiplicity of fasteners, the fasteners adapted to apply a compression on the gasket between the static structure and the removable structure, the static structure and the removable structure having opposed, generally flat, facing surfaces, the spacer and gasket assembly comprising: a substantially non-compressible spacer adapted for receipt between the static structure and the removable structure, the spacer having a spacer thickness; and a gasket having a sticky, deformable, pliable, elastomeric body with an embedded skeleton, the gasket having an uncompressed gasket thickness; wherein spacer and the gasket are adapted to be placed under compression between the facing surfaces of the static structure and the removable structure; and wherein the gasket is a tape.

The tape of the invention of the preceding paragraph may include, in one embodiment, a skin on one of an upper or lower surface thereof. The elastomeric body may be a gel. The gasket may include cutouts and the cutouts may have spacing that matches a spacing of the fastener holes of the removable structure. The cutouts may extend through the skeleton of the gasket so as to receive the spacer under compression without compressing the skeleton. The cutouts may extend through the skin. The spacers may be washers and may be located around at least some of the fastener holes.

A gasket for use between a first and a second part, the parts having facing surfaces under compression with multiple fasteners having multiple fastener holes, the fastener holes having a fastener hole spacing, wherein at least one of the parts has spacers on a facing wall thereof, integral with the part and around at least some of the fastener holes, the gasket comprising: a tape having a sticky, pliable, elastomeric body, the tape for placement between the facing surfaces under compression.

The tape of the invention of the preceding paragraph may include a skeleton encapsulated in the body. The tape may have multiple cutouts and they may extend through the skeleton and may have a spacing matching the fastener spacing. The tape may have a skin on the upper or lower surface thereof. In one embodiment, the first and second parts are an aircraft floorboard and a support member for receiving the aircraft floorboard. The spacers may be integral with the facing wall of the floorboard and the skin may contact the support member.

A spacer and gasket assembly for receipt between a static structure having a surface and fastener holes therethrough and a removable structure having a perimeter shape with fastener holes and a surface: a substantially non-compressible spacer comprising linear members conforming to the perimeter shape of the removable structure, adapted for receipt between the static structure and the removable structure the spacer having a spacer thickness; and a gasket having a sticky, deformable, elastomeric body, the gasket having an uncompressed gasket thickness greater than the spacer thickness; wherein the gasket and spacer are dimensioned for receipt between the static and removable structure, and wherein the spacer is dimensioned for embedment into the body of the gasket.

The gasket a set forth in the preceding paragraph may have a skeleton which may be made of cured polyurethane gel and may be tabular.

A spacer and gasket assembly for receipt between a static structure having a surface and fastener holes therethrough and a removable structure having a surface and fastener holes and with a multiplicity of fasteners engaging the two structures under compression: a gasket having a sticky, deformable, elastomeric body, the gasket having an uncompressed gasket thickness; a multiplicity of substantially non-compressible, discreet, cylindrical shaped spacers dimensioned for receipt between the static structure and the removable structure and proximate the fastener holes, the spacer having a spacer thickness thinner than the gasket; and wherein spacer and the gasket are dimensioned to be placed substantially between the surfaces of the static structure and the removable structure.

The gasket of the preceding paragraph may include a skeleton and the spacer and the gasket may be stacked or side-by-side. The body may be comprised of cured polyurethane gel and may be tabular.

A spacer and gasket assembly for receipt between a metallic static structure having a surface and fastener holes therethrough and a metallic removable structure having a surface with fastener holes, and a multiplicity of fasteners, the fasteners to apply a compression between the static structure and the removable structure, the static structure and the removable structure having opposed, typically flat, facing surfaces; a substantially non-compressible metallic spacer adapted for receipt between the static structure and the removable structure having a spacer thickness; and a gasket having a sticky, deformable, elastomeric body, and a metallic skeleton embedded therein, the gasket having an uncompressed gasket thickness greater than the spacer thickness; wherein spacer and the gasket are adapted to be placed substantially between the facing surfaces of the static structure and the removable structure, under compression.

The spacer and the gasket described in the preceding paragraph may be stacked or side-by-side. The body may be made of cured polyurethane gel and may be tabular. The fastener holes may be a diameter that is about equal to a greater than the shaft diameter of the fasteners.

A floorboard and support member assembly comprising: a floorboard with an upper surface and an at least partly flat lower surface; a support member having a flat upper surface for receiving the lower surface of the floorboard; wherein the floorboard and the support surface have multiple fastener holes, the fastener holes of each having matching spacing for alignment of the floorboard with the support surface; a gasket tape having a sticky, deformable, pliable body and a skeleton; and, multiple discreet spacers; wherein the floorboard and support member hold the gasket tape and spacers under compression therebetween through the use of multiple fasteners engaging the floorboard and support member.

The floorboard and support member assembly of the preceding paragraph may include multiple discrete spacers integral with the floorboard lower surface. The spacers may be multiple discrete spacers, which may or may not surround the holes of the floorboard. The gasket tape may include the skin on one surface thereof and the skin may be against the body of the gasket and against the support member upper surface when the floorboard and support members under compression. The tape may have holes cut through the skeleton and at least partly into the body of the gasket, the holes dimension for receipt of the spacers. The spacers may or may not be integral with floorboard or support surface.

A method of assembling a floor of an aircraft having multiple floor supporting members, the floor supporting members having a flat upper surface with multiple fastener holes therethrough, the method comprising the steps of: providing multiple floorboards, each with a flat underside and multiple fastener holes therethrough, the holes having a hole spacing matching a hole spacing of the floor supporting members; providing a tape having a sticky, pliable, elastomeric body, a skeleton and a skin on one of an upper or lower surface of the body, the tape having a tape thickness; providing multiple spacers, the spacers having a spacer thickness that is less than the tape thickness of the body of the tape; placing the tape and fasteners between the floorboards and the support member such that the fastener holes of each align; inserting fasteners through the fastener holes; and torqueing down the fasteners until a spike in torque resistance is encountered.

BRIEF DESCRIPTION OF THE DRAWINGS

FIG. 2 before compression;

FIG. 3 after compression.

FIG. 7 before compression;

FIG. 8 following compression.

FIGS. 16A, 16B, and 16C illustrate an additional alternate preferred embodiment of a parts assembly using a spacer and gasket assembly.

DETAILED DESCRIPTION OF THE PREFERRED EMBODIMENTS

Figure 1A:
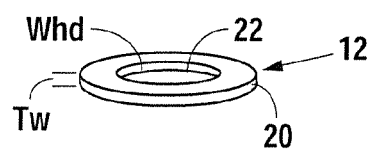
FIG. 1A is a perspective view of a washer for use with the present invention.

FIGS. 1-5 illustrate an embodiment of Applicants' spacer and gasket assembly 10, seen in an embodiment to include a spacer 12 or other mechanical stop, such as a washer, and a gasket 14 for interposition in a stacked or side-by-side arrangement between a removable workpiece 28 and a static structure 30.

Figure 1:
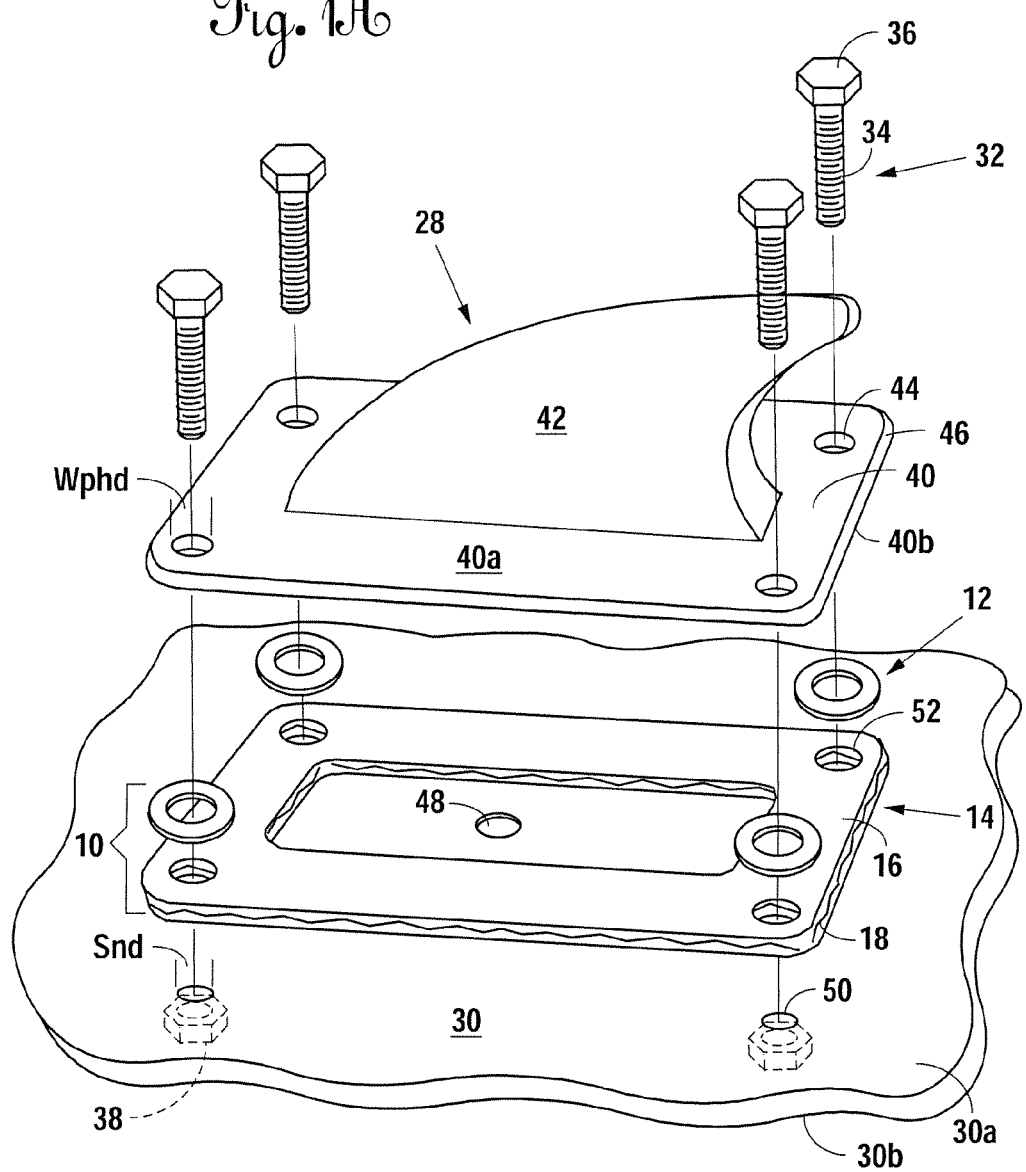
FIG. 1 is an exploded perspective view of Applicants' spacer and gasket assembly as used on an aircraft between a static structure and a removable structure.

A multiplicity of fasteners 32 may be provided for engaging the removable workpiece 28 and static structure 30, the fasteners typically including a shaft 34 with a threaded portion thereon, the shaft having a head 36 at one end, such as a hex head, for engaging a drive tool, such as a torque wrench. Shaft 34 is adapted to engage a nut 38, such as a blind nut or captured nut 38, as illustrated in FIG. 1, the nut typically part of the static structure.

Removable workpiece 28 may, in one embodiment (see FIG. 1), be an aircraft antenna for removable receipt against a gasket 14 and a spacer 12 for attachment to static structure 30 which, in a preferred embodiment, may be the outer fuselage of an aircraft body. Thus, a parts assembly is disclosed, the various parts for use with Applicant's various embodiments of Applicant's spacer and gasket assembly. Removable workpiece 28 may include a base 40, which may be tabular, with a flat upper surface 40a and a flat lower surface 40b. Lower surface 40b may be planer or slightly curved and may conform in shape to outer surface 30a of static structure 30. For example, if outer surface 30a is flat, lower surface 40b may be adapted to conform to the flat outer surface 30a of the static structure and may be flat also. If there is a slight curve to outer surface 30a, lower surface 40b may match the curve of outer surface 30a of the static structure.

Removable workpiece 28 may include an extended member 42, such as the fin of an antenna, the antenna for receipt or transmission of RF or other signals from an aircraft. Removable workpiece 28 may also include a multiplicity of fastener receiving holes 44, the holes with a diameter of Wpd (workpiece diameter). Moreover, the removable workpiece may have an outer perimeter 46.

Static structure 30 may include an access port 48, such as in one embodiment, an access port 48 for electrically conductive cables engaging an antenna electrically to the interior of an aircraft. Outer surface 30a may represent the skin of an aircraft and inner surface 30b may represent the underside thereof. Fastener holes 50 may be provided in the static structure for receipt of fasteners 32 therethrough, the fastener holes having a diameter of Shd, which is typically equal to diameter Wphd, which is, just slightly larger than the diameter of the shaft of the fastener that is carried in holes 44/50.

Gasket 14 may include a body 16 of any suitable compressible and deformable medium, and, in one embodiment, a skeleton 18, the skeleton may be electrically conductive or non-conductive and may be woven or non-woven and, in one embodiment, may be woven fiberglass (i.e., non-conductive) and in another embodiment may be woven aluminum wire (or other suitable electrical conductor, i.e., conductive). Skeleton 18 may be crushable; that is, under some compression, such as about 150-250 psi, may flatten out or otherwise deform. In one specific embodiment, skeleton 18 is a woven fiberglass member.

Typically, a crushable skeleton will be one that will undergo permanent deformation under compression between a workpiece, such as an aircraft antenna and a base, such as the wing skin or fuselage of an aircraft. In one embodiment, there may be permanent deformation or set, so that when pressure is released, there will be very little rebound of the fibers of the crushed skeleton. In one embodiment, the crushable skeleton is woven. In one embodiment of woven skeletons, the skeleton may be metallic, such as an 18×18 strands per inch woven mesh (17 mil strand diameter), aluminum fabric available from Cleveland Wire Cloth, Cleveland, Ohio. In another embodiment, the crushable skeleton may be a non-metallic fabric, such as a woven fiberglass fabric. One such fabric is available from Phifer, Tuscaloosa, Ala., Part No. 3021975, which provides a woven fiberglass non-metallic screen. In yet another embodiment, the skeleton may be a metal foam, such as Duocel® reticulated aluminum foam available from ERG Aerospace.

Typically, the body is coherent and integral with so as to encapsulate the skeleton for those embodiments using a skeleton. Typically, the skeleton is not a solid sheet, but one with many holes or pores. The gasket body material, for example, polyurethane, will flow (during the manufacturing of the gasket), uncured, through the pores like many tiny arms and hook up with other arms of elastomer running through the holes, such as to provide, on curing, a coherent, integrated skeleton, elastomeric gasket.

In a preferred embodiment, gasket 14 may be an Avdec product, for example, Part Nos. AG8430000-88, AG723000-28 or AG822000-14. Some of these gasket bodies and skeleton combinations are disclosed in the following Avdec patents incorporated herein by reference: U.S. Pat. Nos. 6,530,577; 6,695,320; and 7,229,516.

Figure 2:
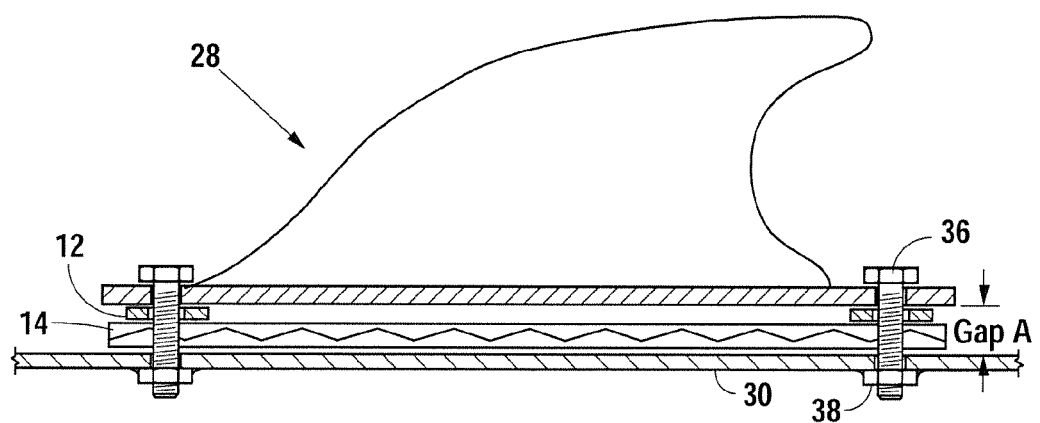
FIGS. 2 and 3 are cross-sectional views of Applicants' spacer and gasket assembly between a removable structure and a static structure on an aircraft body.
Figure 3:
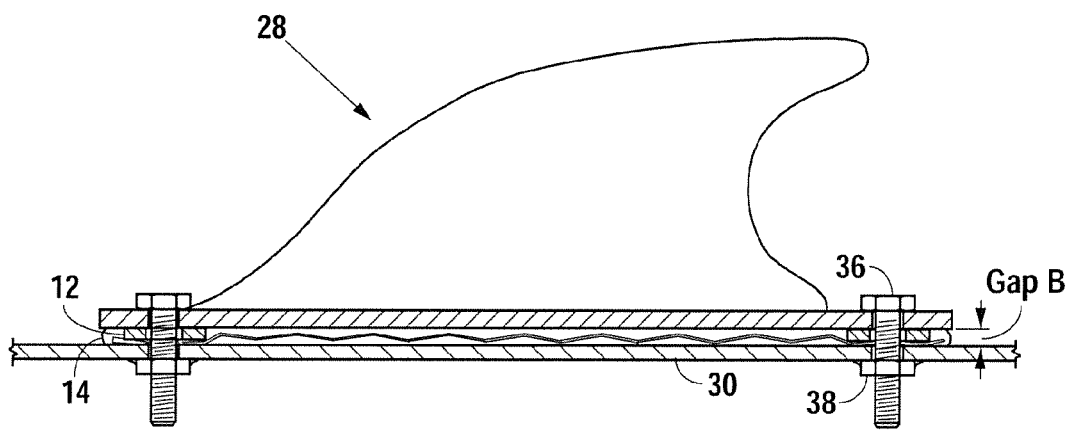

FIGS. 2 and 3 illustrate that the spacer 12 may lay stacked in a pre-compression state above the upper surface of the gasket, prior to compression (FIG. 2). Compression is accomplished by rotation of fastener head 36 against non-movable nut 38, which compression may be achieved with a torque wrench to preselected values.

A comparison of FIG. 2 to FIG. 3 will illustrate that under compression, gasket 14 will deform, with the body at least flowable and deformable by displacement of the spacer thereinto. However, it is also seen that, in one embodiment, preselected torque limits will be reached before all of the elastomer between the lower surface of the washer and the base is squeezed out. That is to say, in one embodiment, there is typically a gap between the lower surface of the spacer and the upper surface of the static structure that leaves some elastomer and some skeletal material (typically crushed) therebetween. If the skeletal material is a woven metallic mesh, it typically engages both the underside of the antenna (moveable piece) and outer surface of the aircraft fuselage (static) usually but not necessarily also in the non-crushed areas.

One of the uses of Applicants' gasket and spacer assembly is to eliminate the re-torque requirements when standard elastomeric gaskets, used without spacers, are tightened between a removable workpiece and a static structure. In the prior art, the deformable and flowable nature of the body of the gaskets caused (after an initial torque to a preselected value) a drop in the released torque after a period of time, for example, about 15 to 60 minutes. That is to say, prior art gaskets for properly seating the gasket between the removable workpiece and static structure required re-torqueing (back up to a preselect value) after a period of time. This is likely due to the set of the elastomeric body, deformation taking place over a period of time under compression, which would require re-torqueing of fasteners 32.

Figure 4:
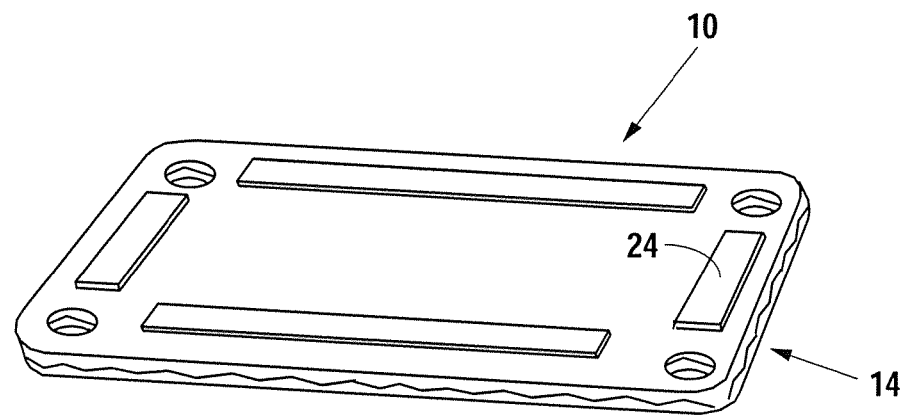
FIGS. 4 and 5 are alternate preferred embodiments of Applicants' spacer and gasket assembly.
Figure 5:
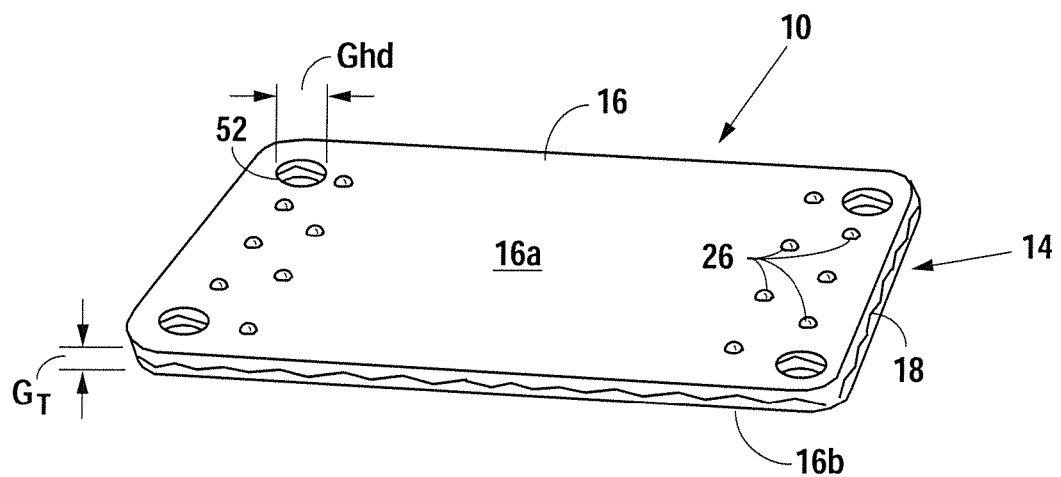
Figure 12A:
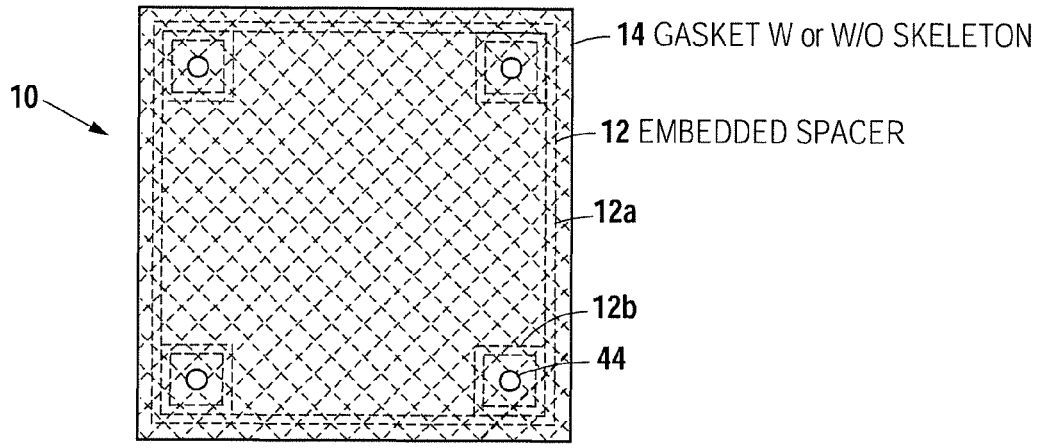
FIGS. 12A and 12B are top and side views of another embodiment of the spacer and gasket assembly.
Figure 12B:
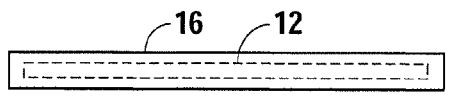
Figure 14:
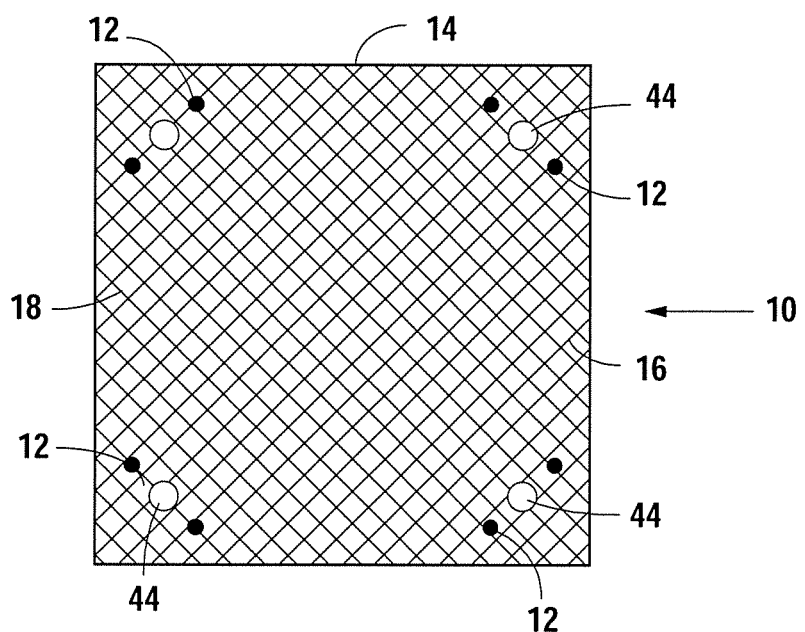
FIG. 14 is a top view of another embodiment of the spacer and gasket assembly.

Applicants' use of a novel spacer and gasket assembly provides a substantially incompressible mechanical stop, such as washer or, in the embodiments set forth in FIGS. 4 and 5, plates 24 (with flat top and flat bottom surfaces against the pieces under compression) or spheres 26 (or any suitable configuration), FIGS. 12A and 12B, shaped to body, and FIG. 14 disc or cylinder (flat top and bottom surfaces). In one embodiment, the incompressible members may have flat top and bottom surfaces for generally flush contact with the moveable workpiece and stationary or base member. On the other hand, the top and bottom surfaces of the incompressible spaces, including conductive metal spaces, may have spikes or pointed projections extending therefrom for good electrical contact between the two pieces. Such substantially non-compressible members, when stacked with relation to the deformable body of the gasket, including, typically, a compressible skeleton, will provide a substantial mechanical block, such that initial torqueing of the fasteners to a preselected value will not result in a substantial drop (overtime) in such preselected value. Therefore, re-torqueing may be eliminated.

In FIGS. 1-3, the mechanical stop or spacer is seen to be configured as a washer, that is, a generally cylindrical body having flat upper and flat lower surfaces, and having a thickness Tw, an outer perimeter 20, and an inner perimeter 22. The diameter of the inner cutout of the washer is designated Whd.

In a preferred embodiment, the spacers are stacked (placed on top of the gasket) (see FIGS. 2 and 3), and spacer thickness Tw may be nominally 0.03" or in the range of about 0.01" and 0.07". Gasket thickness may be nominally about 0.045" or in the range of about 0.015" and 0.120". The hardness of the elastomer body may, in one embodiment, be in the range given in the previous AVDEC patents and a skeleton may be woven fiberglass.

Figure 6:
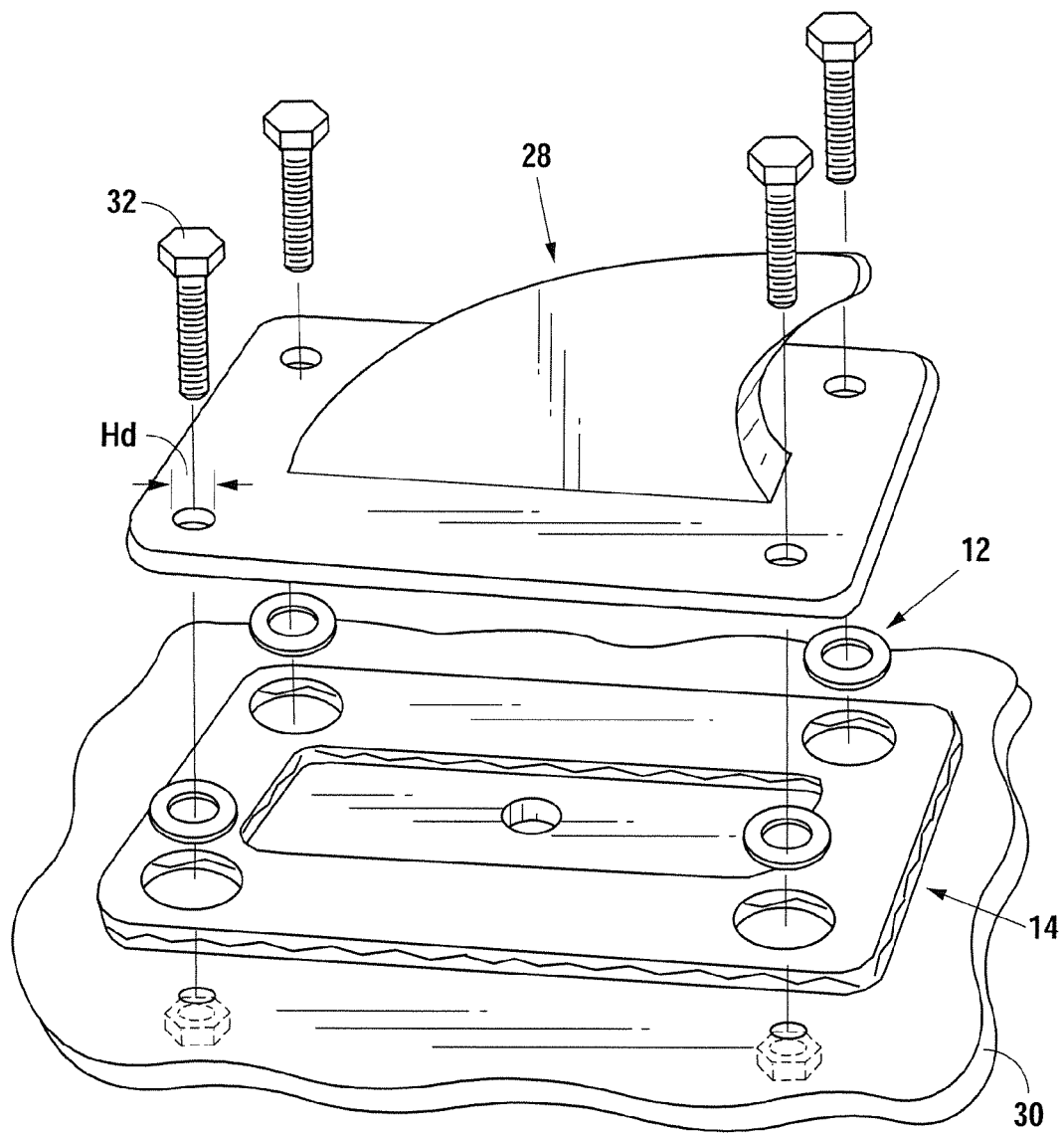
FIGS. 6, 7, and 8 are exploded perspective and side elevation cross-sections of an alternate preferred embodiment of Applicants' spacer and gasket assembly.
Figure 7:
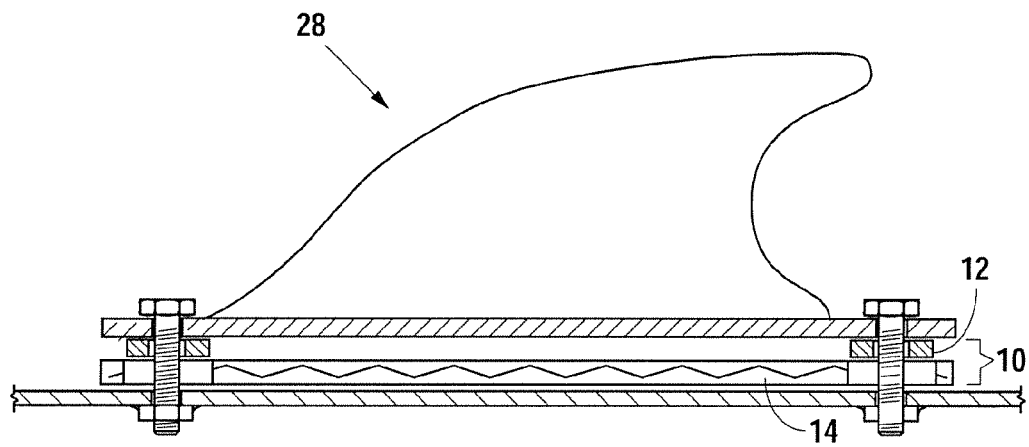
Figure 8:
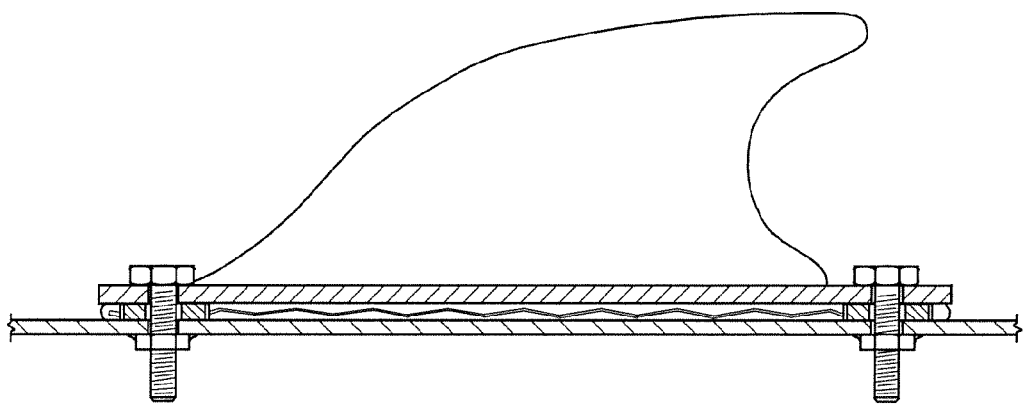
Figure 15A:
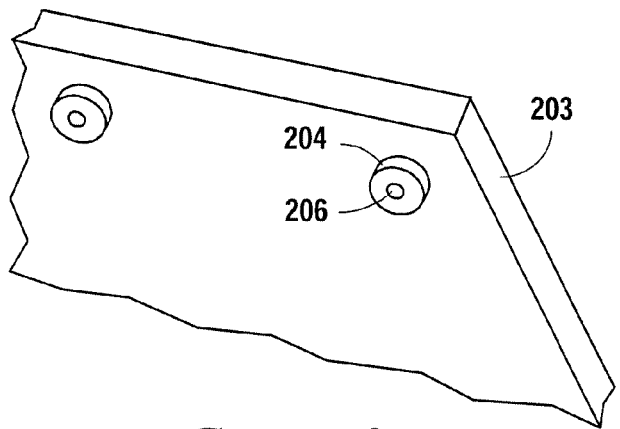
FIGS. 15A, 15B, and 15C illustrate an alternate preferred embodiment of a parts assembly using a spacer and gasket assembly.
Figure 15B:
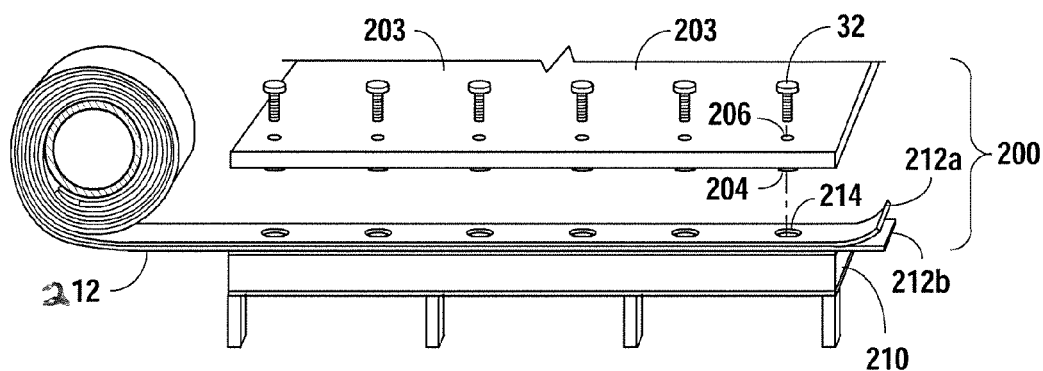
Figure 15C:
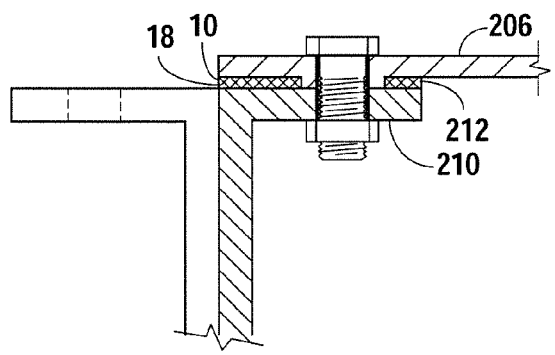

Turning to FIGS. 6 and 7, it may be seen that an alternate preferred embodiment of Applicants' spacer and gasket assembly may be used, wherein the mechanical stops, instead of being stacked on top (or bottom) of the gasket and compressed thereinto, will lay adjacent, in side-by-side fashion, to the gasket (see FIGS. 6 and 10, for example), and, in one embodiment, between the lower surface of the antenna and upper surface of the fuselage or between an aircraft floorboard and a floorboard support (see FIGS. 15C and 16C). The gasket may be typically about 45 mil (range 15 to 80 mil) thicker than the substantially incompressible mechanical stop and deformation of the body will be occasioned during the initial torqueing of fasteners 38.

Gap A, FIG. 2, is seen to be typically in the range of about 25 mil to 200 mil; that is, the gap generated by uncompressed stacked spacer and gasket assembly. FIG. 3 illustrates gap B smaller, the washer being compressed into the body of the gasket, which gap may be in the range of about 10 mil to 120 mil, which will typically represent sufficient torque on fasteners 38 to be within aircraft specifications and not require re-torque (typical aircraft antenna mounted to aircraft outer surface, metallic or non-metallic skeleton).

FIG. 2 illustrates an embodiment providing a slight cutback or undercut of the outer perimeter of the gasket with respect to the outer perimeter of the workpiece. This indentation is typically sized that, under compression as seen in FIG. 3, the deformation of the elastomer and its subsequent push outward will bring the outer edge of the gasket, when under compression, to about or just beyond the outer edge of removable workpiece 28. This undercut may be in the range of about 50 mil to 250 mil.

Figure 9A:
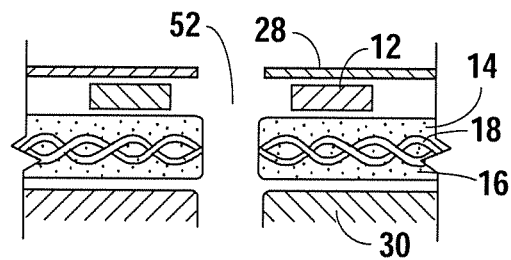
FIGS. 9A, 9B, and 9C illustrate cross-sections of the stacked washer in cross-sectional side view, uncompressed, partially compressed, fully compressed.
Figure 9B:
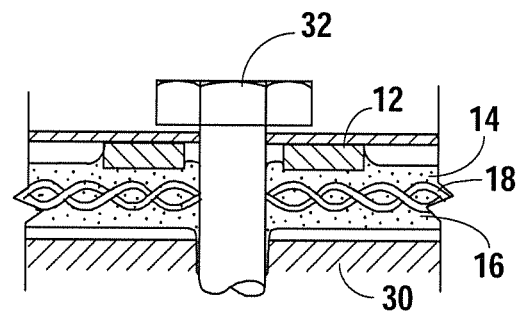
Figure 9C:
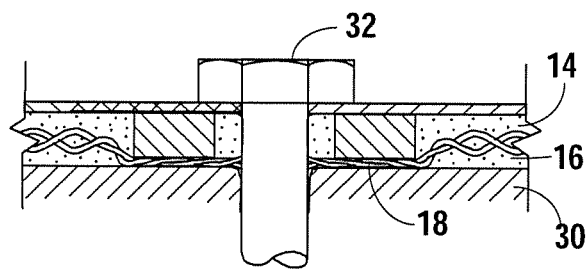

FIGS. 9A, 9B, and 9C illustrate a number of features of embodiments of Applicants' parts assembly and spacer and gasket assembly. FIG. 9A shows a stacked version uncompressed with the washer laying atop the body of the gasket, the body of the gasket laying on the static member and the top piece being a workpiece, in this case, the antenna of an aircraft. However, under close examination, it may be seen that a hole 52 pre-cut in the gasket for the passage of the fastener therethrough is slightly undercut in one preferred embodiment. The term "undercut" means that the diameter of the hole (typically cylindrical) is equal to or slightly less than the diameter of the shaft of the fastener that is passing through the hole. This will allow some drag on the sticky elastomeric gel as it clings to the shaft of the fastener as the fastener passes through the gasket and into the static structure. This also helps ensure that when the gasket is tightened down and squeeze-out occurs (FIGS. 9B and 9C) that that squeeze-out will be of sufficient volume to fill in and around the gasket holes and some into the fastener holes in the base and/or workpiece. It is disadvantageous for too much air to be around the fastener holes. In other embodiments, the fastener hole in the gasket is about equal to or slightly larger (overcut) when compared to the fastener diameter. In yet other embodiments, FIGS. 10, 15B, and 16B, a wet seal may be provided during parts assembly.

In one embodiment, Applicants' various assemblies illustrated and described herein are used on parts engaging the surfaces of an aircraft. As a result, there is sometimes a substantial pressure difference as between the aircraft exterior and the aircraft interior, for example, when the aircraft is at cruise altitude. That pressure difference is typically great as the aircraft climbs to altitude. Moreover, the pressure differences cycle, as do temperature differences. It may be quite cold at a cruising altitude of 40,000 feet and the air pressure quite low. As a result, one of the objects of Applicants' assembly is to sufficiently fill voids or air pockets which might trap gas and moisture when the aircraft is exposed to thermal and pressure cycles. It has been found that undercutting the gasket around the fastener holes appears to help achieve these benefits. The undercut may be in the order of magnitude of about 15-100 mil in one embodiment. Also, it has been found that "overcutting" the inner diameter of the washer is also beneficial, the overcutting of the washer refers to the inner diameter of the washer being larger than the fastener shaft passing through. This overcut may be in the magnitude of about 15-100 mil in one embodiment.

In FIGS. 5 and 6, it is seen that hole 44 diameter Hd in the removable workpiece is typically just slightly larger than the shaft 34 of fastener 32, as is known in the art. Ghd is gasket hole diameter 52 and is, in one embodiment, sufficient to receive the spacer therethrough for the cutout embodiments where the spacer is adjacent to the gasket, rather than sandwiched or stacked with the gasket.

It is seen in FIGS. 9B and 9C that, as the workpiece is torqued down, gasket body 16 has sufficient flowability to deform responsive to the washer being pushed into the body. Some of the gasket body material, typically cured polyurethane gel, will be pushed inward and help fill the void left by the gap between the spacer and the fastener and some will be pressed up against the inner facing wall of the workpiece and the outer facing wall of the static structure.

In FIG. 9C, it is seen that, when sufficient torque is placed on the fastener that the lower surface of the spacer will contact the upper surface of the skeleton and press it against the upper surface of the base or static structure 30. In the process of torqueing down the fastener, this can actually be felt (rotational resistance force of the fastener increases) and passing this point typically crushes the fibers of the woven or other crushable skeleton (which may, like the spacer, be metallic) against one another to cause skeletal deformation. This typically ensures that a sufficiently tight seal is made from the workpiece through the spacer and skeleton to the static structure.

In another embodiment, as illustrated in FIG. 6 (adjacent spacers), the holes may be overcut, so that the washer is not pressed into the gel body. In one form of this particular embodiment, a metallic skeleton may be used. In one embodiment of such a configuration, if a metallic skeleton is used, for example, for an EMI application where conductivity is desired between the static piece or base and the moveable piece, then the washer may be either metallic or non-metallic and is slightly thinner than the precrushed thickness of the metallic skeleton. By sizing the skeleton and washer in such a fashion in the overcut (adjacent spaces) application, it will help ensure that there is some crushing of the metallic skeleton, so as to ensure good contact and conductivity before the hard stop or mechanical stop of the underside of the moveable piece against the washer is achieved.

In one embodiment of the various parts and the spacer and gasket configurations illustrated herein, the gasket (precompression) is about 45 mil thick with an encapsulated about 13 mil skeleton and about a 31 mil thick nylon (or other suitable) washer. Typically, the washer will be driven into the skeleton so as to at least partially crush the skeleton.

The fastener shafts, in one embodiment, may be typically sized between about 0.164 inch to 0.250 inch diameter. The tape or gasket is typically flexible and tabular (generally flat top and bottom, thickness much less than width and length) and the area may range, in one embodiment, from about 25 square inches to about 100 square inches. The number of fasteners between the moveable workpiece and the static base may range, in one embodiment, from 4 to 10. The clamping pressure, in one embodiment, may be about 150 to 450 psi (or substantially to a crushed skeleton). In another embodiment, the range is about 150 to 350 psi (to a crushed skeleton). In one embodiment, nylon washers may be used and the gasket may be slightly undersized, typically, in the range of about 1/64 inch to 1/32 inch undersized or undercut, for a tight interference fit with the shaft of the fastener.

Figure 10:
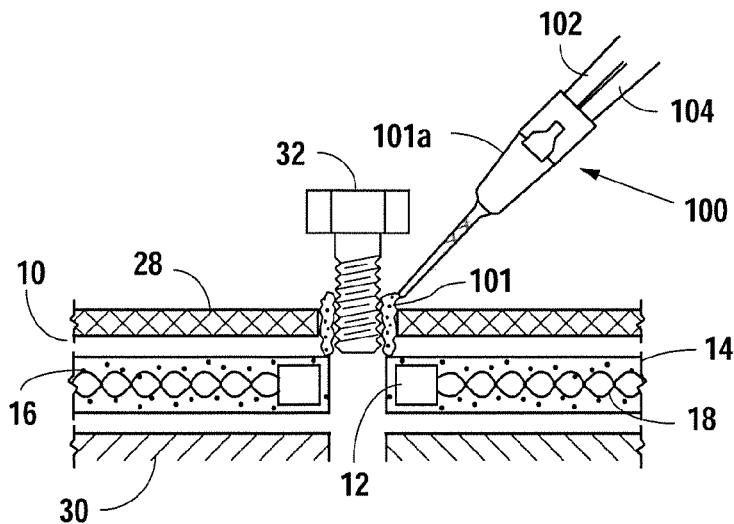
FIG. 10 illustrates a cross-sectional view of a procedure for installing any of the embodiments of Applicant's spacer and gasket assembly, wherein a wet seal of uncured polyurethane gel mix is applied on or about the fastener or fastener hole junction prior to installation of the fastener through the workpiece into the static structure.

FIG. 10 illustrates the application of an uncured ("wet"), sticky, resilient polyurethane 101 on or about fastener 32 and/or the spacer 12 and/or the hole in spacer and gasket assembly 10. FIG. 10 illustrates that uncured polyurethane (or other suitable curable, injectable two-part mix sealant) 101 may be applied with an applicator 100 having a nozzle 101a. Nozzle 101a typically mixes the two parts of the sealant, in one embodiment, a polyol 102 and an isocynate 104, which will mix in the nozzle and flow into and adhere in and around fastener 32, and the hole in the gasket. It will typically flow at least partway or all the way through the hole in the spacer and gasket assembly and the hole (if there is one) in spacer 12 and typically, at least partially, into static structure 30. As the polyurethane is uncured in the applied state, it has a consistency somewhat similar to thick but sticky, slow flowing motor oil and will stick to, as well as flow about and coat, the space between the fastener and the gasket, the shaft of the fastener, and the blind nut or a captured nut to which the fastener may be attached. In one embodiment, uncured polyurethane mix 101 is applied at the time of placing the removable structure 28 onto the gasket, which is on the static structure 30, such that the fastener is fastened down before the mix fully cures. The details of polyurethane 101 may be found in the patents incorporated herein by reference. By applying the pre-cured mix to the fastener and the fastener area, as well as the hole, through static structure 30 and spacer and gasket assembly 10, a more complete environmental seal is typically provided. This will help inhibit corrosion.

Figure 11A:
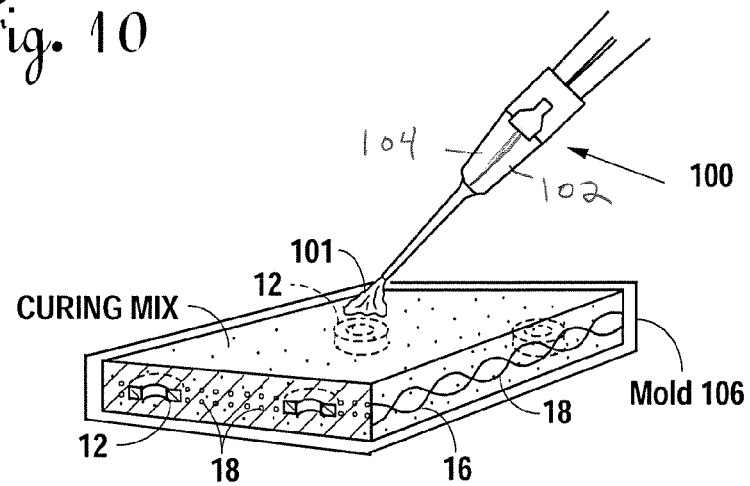
FIGS. 11A and 11B illustrate in perspective views, a spacer and gasket assembly in which the spacers are embedded in the body of the gasket, such that the assembly is a unitary one-piece assembly.
Figure 11B:
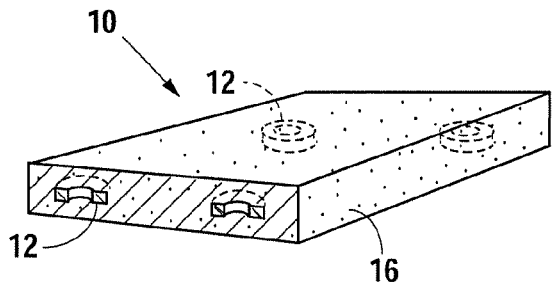

FIGS. 11A and 11B illustrate that Applicant's spacer and gasket assembly 10 may include spacers 12 that are, during the manufacturing of the gasket, molded into and become integral with body 16. Moreover, body 16 may be gel only, such as polyurethane gel and, in one embodiment, not have a skeleton at all (see FIG. 11B). For example, FIG. 11A illustrates uncured mix 101 being applied to a mold 106 wherein, prior to curing or before squeezing the uncured mix 101 (into the mold), the spacers may be placed in the mold. Either way, when the polyurethane mix cures, with or without the skeleton, the entire assembly may be lifted out of the mold and used with an aircraft antenna, floorboards or other suitable structure. The mold may first be lined with release paper (not shown), for ease of removal of the gasket after the mix cures. In any of the embodiments shown, the thickness of the spacer 12 in relation to body 16 may be such that they are about the same or the spacer is less in thickness (in one embodiment, about 40-80% of the precompressed thickness of the body).

FIGS. 12A and 12B illustrate an alternate embodiment of Applicant's spacer and gasket assembly 10, one in which the spacer 12 is embedded in the resilient gel gasket body 16 with or without skeleton. In the illustrated embodiment, the substantially incompressible spacer (under typical psi ranges found between the static assembly and the moveable workpiece, in an aircraft, for example), which is embedded is seen to include members 12a that substantially conform to the outer perimeter of the gasket. These may be linear members, that may be along the edge of the gasket or set back, but conform to the shape of the edge. In one embodiment, perimeter conforming members 12a are set back from the perimeter in the order of magnitude of about 20 to 250 mil, for example. FIGS. 12A and 12B also show that, in addition to perimeter conforming members, the spacers may include fastener hole branches 12b that branch off from the perimeter conforming members to substantially surround the fastener holes. These perimeter members may provide support substantially around a fastener, but spaced back somewhat from the spacer hole. In some embodiments, there may be a combination of the linear member spacer illustrated in FIGS. 12A and 12B, and the discrete spacers of the other embodiments. A skeleton may or may not be used. As with the other embodiments, the spacers may be metallic or non-metallic. In FIG. 12B, it is seen that gasket body 16 may substantially embed spacer 12.

A manufacturing process for the assembly is illustrated. See FIGS. 11A and 11B. The embedded spacers 12 may be laid into uncured mix 101 before it cures in a mold 106 configured to the required perimeter shape of the gasket. The embedded spacer may be laid in first and the uncured mix built up around it, or layered in multiple steps, i.e., thin layer of mix is first cured, then spacer laid on top and additional gel added and allowed to cure.

Figure 13A:
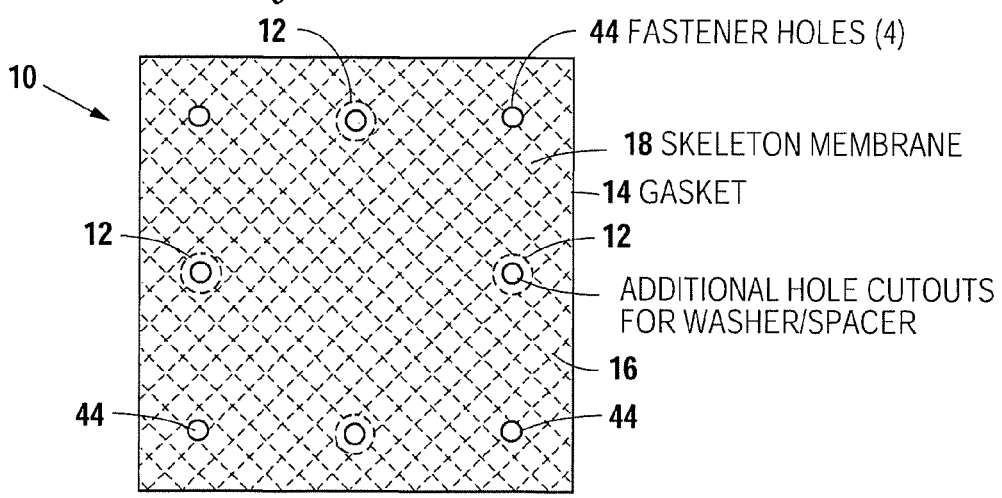
FIGS. 13A and 13B are top and side views of another embodiment of the spacer and gasket assembly.
Figure 13B:
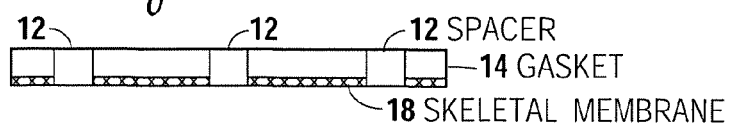

FIGS. 13A, 13B, and 14 show how spacers 12 may be placed in relation to fastener holes 44 in body 16. As set forth hereinabove, the spacer and gasket assembly may have, in one embodiment, such as FIGS. 1, 2, 3 above, spacers which encircle the fasteners. In other embodiments, they may lay adjacent the fastener holes. For example, in FIGS. 4 and 5, there are spacers 24 (flat top and bottom)/26 (spherical) within about one to three fastener diameters from the fastener to help spread the mechanical stop and minimize flexing of the body of the workpiece. As in the previous embodiments of the spacer and gasket assembly, spacers in FIGS. 10-14 may be embedded during manufacturing or may be stacked during assembly of the workpiece, or placed in holes 44 in the gasket, the cutouts or holes 44 shaped to receive the spacers. The spacer holes may be made during manufacturing by die cut. The cutouts for spacers may form in the same manner as cutouts for fastener holes. Fastener holes through the skeleton may be made with a sharp, pointed tool such as an awl, on-site during installation.

In FIGS. 13A and 13B, it is seen that spacers 12 here discrete, may be placed about equidistant along a line between adjacent fasteners or fastener holes 44. These spacers may be configured in any shape set forth herein or in any suitable shape. They may be placed in such positions and used, in one embodiment, with the fastener encircling spacers (washers) as seen, for example, in FIG. 6. In another embodiment, the spacers may be used without the washers. FIG. 13B illustrates an embodiment in which skeletal member 18, either metallic or non-metallic, and either woven or unwoven, may be placed closer to or adjacent one of the top or bottom surfaces of the body of the gasket rather than centered. This may provide selective adhesion with the parts which compress the gasket to make subsequent release easier.

FIG. 14 illustrates that in one embodiment, spacer 12 in any shape disclosed herein, discreet, linear, disc or cylindrical, spherical, tabular, washer, etc., may be placed adjacent on either side of a fastener hole, typically about one or in the range of about 2 to about 5 fastener diameters, to provide a mechanical stop on either side of fastener hole 44 and adjacent an outer perimeter edge of the gasket. It is seen that each of the fastener holes have a pair of spacers and, in one embodiment, are configured diagonally, with respect to the corner of gasket 14 to either side of the fastener hole.

FIGS. 15A, 15B, and 15C illustrate an alternate preferred embodiment if a spacer and gasket assembly 10, in this case for use with a floorboard assembly 200 or other suitable environment. Floorboard 203, such as aluminum floorboard for an aircraft, is provided with an integral or built in, typically cylindrical, integral spacer 204. It may be machined into the floorboard when the floorboard is manufactured, or provided separately and attached by an adhesive or welding or any other suitable means. Fastener hole 206 is provided through integral spacer 204 for receipt of a fastener 32 therethrough. A multiplicity of built-in or integral spacers 204 may be provided, in a pattern that will match holes in a support member 210 for receipt of the floorboard thereon. In one embodiment, the support member may be a carbon fiber or composite upright member of an aircraft. In one embodiment, a spacer gasket assembly 10 comprising a cured polyurethane gel tape 212 with spacer holes 214 cut through is provided. Holes 214 are cut in a diameter sufficient to receive spacers such that the spacer will contact the top of support surface 210 when compression is applied an act as a stop, with applicant's gasket tape, providing an environmental seal to the facing surfaces of the two parts providing the compression.

Thus, Applicant's spacer and gasket assembly 10 may include a gasket in the form of a tape 212 having a gel body 16 as set forth elsewhere in these specifications and, optionally, skeleton 18 (see FIG. 15C). Applying torque to fastener 32 will bring floorboard 203, more specifically, lower surface of integral spacer 206 (or washer, not shown) into contact with the top surface of support member 210.

Applicant's tape, in one embodiment, may be HT 3000, HT 3000 RT or HT 3935, available from AvDec, 1810 Mony St., Fort Worth, Tex. 76102. Tape 212 is a form of a gasket, functionally assisting with providing of an environmental seal with providing the compression on the gasket. It also provides some resistance to compression, as does the spacer, more greatly so when the parts contact the spacer. However, being a tape, it is usually cut to fit, lengthwise, at the worksite, but used in the width provided typically between about ½" and 4" inches. Non-tape gaskets, on the other hand, typically are precut to the footprint of a workpiece or supplied in 24" wide sheets. In one embodiment, a non-sticky (to the floorboard), film 212a (such as PTFE) is applied to body 16 in the manufacturing of the tape. Film 212a is sticky to body 212b, but not to any of the parts under compression or workpieces. A single-sided sticky means there is one film layer or skin 212a on the surface of the tape or gasket. In one application, a single-sided sticky is used between the two parts (floorboard 203 and support 210), in one embodiment with the non-sticky side up (see FIG. 15B) and, in another embodiment (FIGS. 17A and 17B), with film 212b down and sticky side up. Having the non-sticky side up makes removal of the floorboard relatively straightforward. The gel body being sticky will not be in contact with the underside of the floorboard in FIGS. 15B and 15C, but provides a good environmental seal to block moisture and contaminants when sticking to the support surface. The sticky side may be placed against the workpiece when ingress of potential contaminants may be a problem. The non-sticky side may be placed against the workpiece for which a "clean" removal is desired in one embodiment the support member (FIG. 17A), in another the floorboard (FIG. 15B).

FIGS. 16A, 16B, and 16C illustrate yet another gasket and spacer assembly 10, similar to that in FIGS. 15A, 15B, and 15C (using tape), except that loose (non-integral) spacers 12 are used to place in the tape cutout holes 214. Again, this may be used with the floorboard assembly 200. Optionally the uncured two-part mix 101 may be applied (see FIG. 16B), to provide a wet seal, which, when cured will help hold the washer/spacer 12 in place during removal of the floorboard and provide a good environmental seal.

Figure 17A:
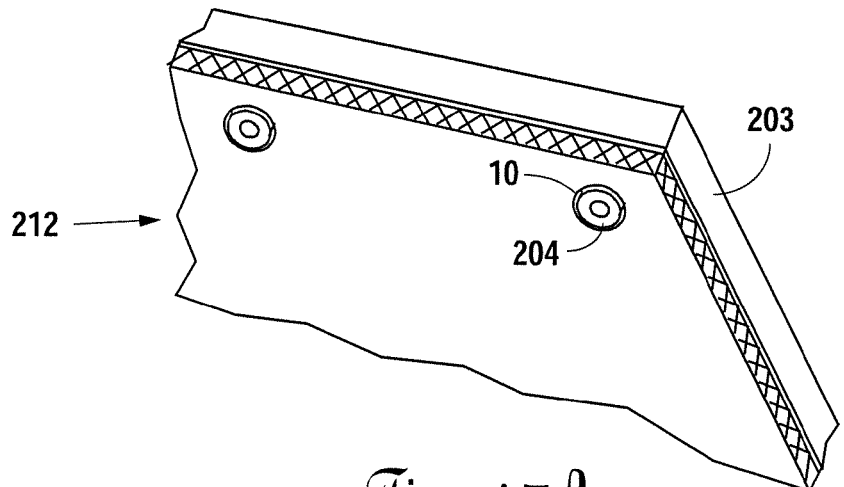
FIGS. 17A and 17B include an alternate embodiment of a spacer and gasket assembly for use with a floorboard assembly.
Figure 17B:
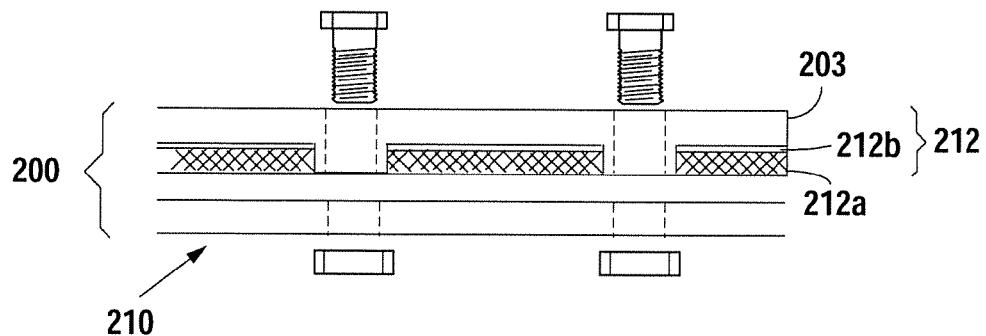
Figure 18:
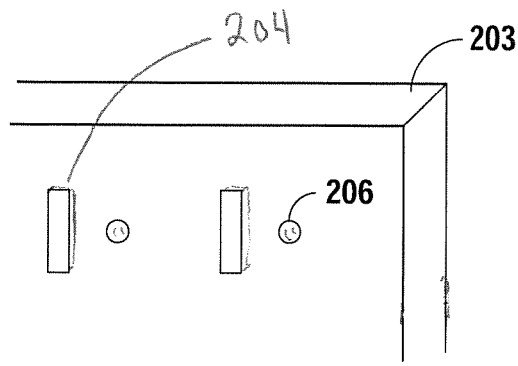
FIG. 18 is an alternate embodiment of an integral spacer.

FIGS. 17A and 17B illustrate a floorboard assembly 200 comprising a floorboard 203 with a gasket and spacer assembly 10 therebetween. In this embodiment, the gasket is in the form of a polyurethane gel tape 212 and the spacers integral to the floorboard. The gel tape has a skin or film 212a, such as PTFE, but the sticky side is "up" against the underside of floorboard 203. This puts the non-sticky film "down" against the support 210, which may be composite and the floorboard aluminum. There will be a clean release from support 210. FIG. 18 illustrates an alternate embodiment of an integral spacer 204 that is not around hole 206 in floorboard 203.

Figure 19A:
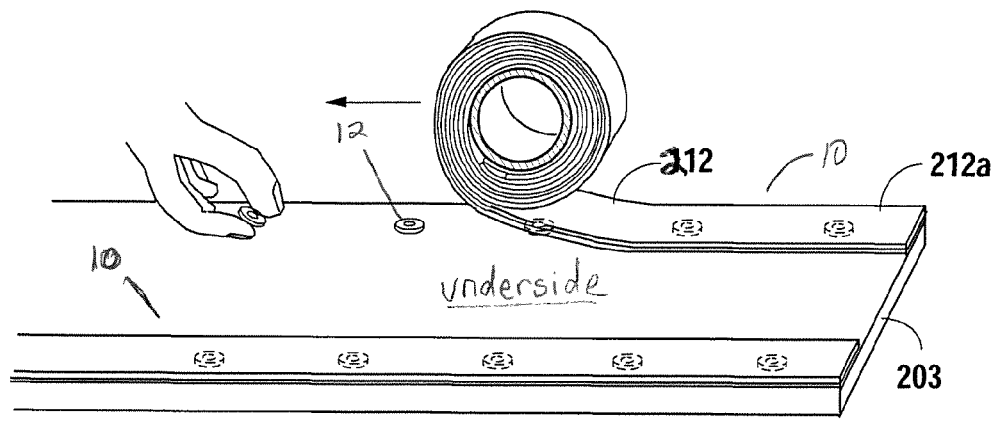
FIGS. 19A and 19B illustrate a preferred embodiment of a spacer and gasket assembly used with a floorboard assembly.
Figure 19B:
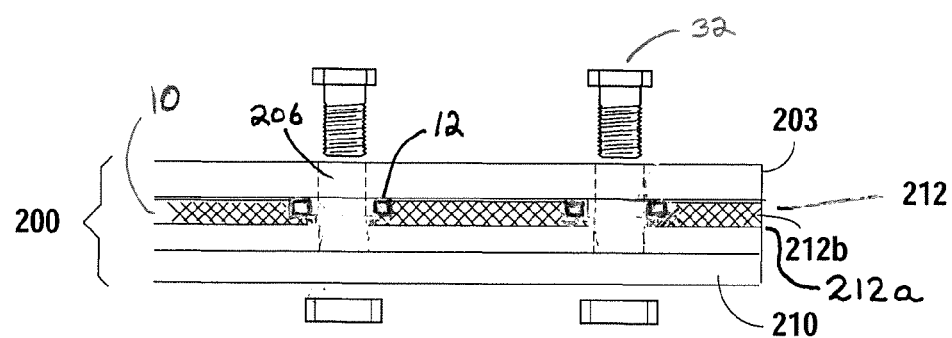

FIGS. 19A and 19B illustrate a method of assembling loose spacers 12 on floorboard 203, so that the loose spacers 12 are affixed to the floorboard before the floorboard is placed on support member 210. This method involves placing the floorboard flat with the underside of the floorboard up as in FIG. 19A. The spacers, here in front of washers for encircling holes 206 of the floorboard (but any of the spacer shapes may be used) are laid on one or more of the holes just before the tape is placed, sticky side down, down over them. A first washer and a subsequent second and third washer may be placed down against the holes in the floorboard. The edge of the tape is laid down at the edge of the floorboard and over the first washer, then against the floorboard underside then over the second washer, etc. The tape is sticky side to the floorboard underside and therefore will surround and hold the washer in place and against the floorboard. Even after the floorboard is turned right side up (FIG. 19B). After the tape is laid down along the hole path, while the washers are placed manually about the holes, the tape is cut to length at the end of the line of holes or floorboard. The floorboard is then inverted (right side up). However, since the tape is holding the washers in place against the underside of the floorboard the washers will stay in place (FIG. 19B).

Figure 20:
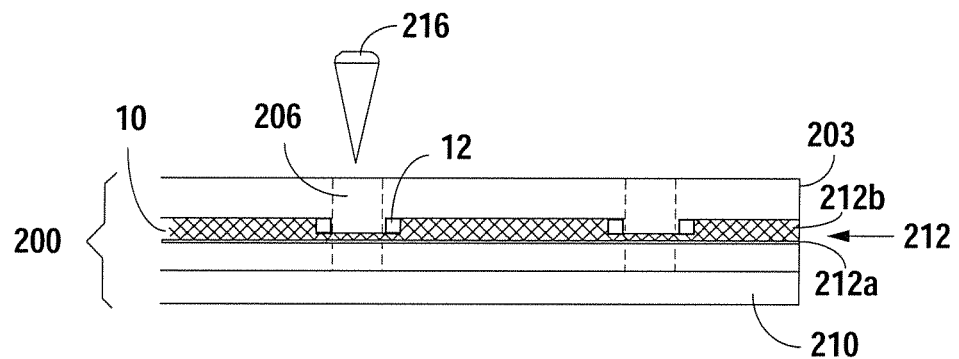
FIG. 20 is a method of assembly a floorboard assembly.

After the floorboard is placed against the upper surface of the support in a manner which aligns the holes in the floorboard with the holes in the support, and awl 216 or other pointed tool is driven through the hole in the floorboard through the hole in the washer through the skeleton of the tape, if there is one and through the skin. See FIG. 20. The skin is against the upper surface of support member 210 and is usually tough. In puncturing the skin with an awl the subsequent insertion of the fastener (see FIG. 19B) is easily accomplished. Moreover, when one removes the floorboard it easily removes off the support member because the non-sticky skin is against the support surface, and all the washers are held in place by the sticky tape 212.

A method of assembling a floor of an aircraft having multiple floor supporting members 210 is provided. The floor supporting members have a flat upper surface with multiple fastener holes. A tape, in one embodiment having a sticky pliable gel body 212b with a skeleton embedded therein and a skin 212a on one of an upper or lower surface of the body is provided. The tape has a tape thickness. Multiple spacers are provided. The spacers having a spacer thickness that is typically less than the tape thickness. The tape and fasteners are placed together between the floorboards and the support members such that the fastener holes of the floorboards and the support members align. Fasteners are then inserted through the fastener holes and torqued down. They are typically torqued down such that the gel of the body is squeezed out above and below the spacers and, if there is a skeleton above or below the fasteners, they will flatten out the skeleton. At this point, there will be a sudden sharp increase in the resistance force on the torquing instrument, such as a torque wrench. The spacers alone or the spaces in combination with a skeleton, which may be crushed, provide a mechanical stop between the floorboard in the support member. While almost all of the deformable gel is squeezed out there is still a very thin layer that provides a good environmental seal, but is not thick enough to take a set over a period of time which set would require a retorque of the fasteners. The thickness of the gel when this torque spike is sensed or measured is likely less than one or two mil.

Although the invention has been described with reference to a specific embodiment, this description is not meant to be construed in a limiting sense. On the contrary, various modifications of the disclosed embodiments will become apparent to those skilled in the art upon reference to the description of the invention. The invention is not limited to a process having all the steps described in the preferred embodiments. There may be utility in utilizing a process with more limited steps as defined in the claims. Individual technical features of the illustrated embodiments are not limited to use in those embodiments, and may where suitable, be used with any embodiment falling within the scope of the claims. It is therefore contemplated that the appended claims will cover such modifications, alternatives, and equivalents that fall within the true spirit and scope of the invention.

The invention claimed is:

1. A spacer and gasket assembly for receipt between a static structure and a removable structure with fastener holes and the static structure and removable structure being engaged through a multiplicity of fasteners having a shaft diameter, the fasteners adapted to apply a compression on the gasket and spacer assembly, the static structure and the removable structure having opposed, facing walls, the spacer and gasket assembly comprising:
   multiple non-compressible spacers having a spacer thickness, the spacers for receipt between the static structure and the removable structure, the spacers having a flat top and a flat bottom; and
   a gasket having a deformable, flowable, sticky, elastomeric body with a top and a bottom surface and a skeleton having a skeleton thickness less than a body thickness, the skeleton substantially encapsulated by the body, the gasket having an uncompressed gasket thickness; and
   a spacer thickness, wherein the spacer thickness is about 40-80% of the uncompressed gasket thickness wherein the spacers do not encircle the fastener;
      wherein spacers and the gasket are placed under compression between the facing walls of the static structure and the removable structure such that at least one of the top or bottom surface of the gasket body is in direct contact with one of the facing walls.

2. The assembly of claim 1, wherein the spacer is cylindrical and the flat top and flat bottom are parallel to a top and a bottom plane of the gasket body.

3. The assembly of claim 2, wherein the spacer is metallic.

4. The assembly of claim 2, wherein the spacer is encapsulated in the gasket.

5. The assembly of claim 2, wherein the at least some spacers are adjacent to the fastener holes.

6. The assembly of claim 5, wherein the spacers adjacent the fastener holes are two or more.

7. The assembly of claim 1, wherein the skeleton is cut out to receive at least some of the multiplicity of fasteners.

8. The assembly of claim 1, wherein at least some of the fasteners are located equidistant along a line between adjacent fastener holes.

9. The assembly of claim 1, wherein the skeleton is closer to one of a top or bottom surface of the gasket.

10. The assembly of claim 2, further including washers located in the gasket body so as to encircle the fasteners when the spacer and gasket assembly is placed under compression between the static structure and the removable structure.

11. The assembly of claim 2, wherein the body comprises a polyurethane gel.

12. The assembly of claim 2, wherein the gasket includes fastener holes.

13. The assembly of claim 1, wherein the gasket is a tape.

14. The assembly of claim 1, wherein the removable structure is a floorboard of an aircraft.

15. The assembly of claim 1, wherein the gasket further includes a skin.

16. A spacer and gasket assembly for receipt between a static structure and a removable structure with fastener holes and the static structure and removable structure being engaged through a multiplicity of fasteners having a shaft diameter, the fasteners adapted to apply a compression on the gasket and spacer assembly, the static structure and the removable structure having opposed, facing walls, the spacer and gasket assembly comprising:
   multiple non-compressible spacers having a spacer thickness, the spacers for receipt between the static structure and the removable structure, the spacers having a flat top and a flat bottom; and
   a gasket having a deformable, flowable, sticky, elastomeric body with a top and a bottom surface and a skeleton having a skeleton thickness less than a body thickness, the skeleton substantially encapsulated by the body, the gasket having an uncompressed gasket thickness; and
   a spacer thickness, wherein the spacer thickness is about 40-80% of the uncompressed gasket thickness wherein the spacers do not encircle the fastener;
      wherein spacers and the gasket are placed under compression between the facing walls of the static structure and the removable structure such that at least one of the top or bottom surface of the gasket body is in direct contact with one of the facing walls;
      wherein the spacer is cylindrical and the flat top and flat bottom are parallel to a top and a bottom plane of the gasket body;
      wherein the spacer is metallic;
      wherein the spacer is encapsulated in the gasket;
      wherein the at least some spacers are adjacent to the fastener holes;
      wherein the spacers adjacent the fastener holes are two or more;
      wherein the skeleton is cut out to receive at least some of the multiplicity of fasteners;
      wherein the body comprises a polyurethane gel; and
      wherein the gasket includes fastener holes.

17. The assembly of claim 16, wherein at least some of the fasteners are located equidistant along a line between adjacent fastener holes.

18. The assembly of claim 16, wherein the skeleton is closer to one of a top or bottom surface of the gasket.

19. The assembly of claim 16, wherein the removable structure is a floorboard of an aircraft.

20. The assembly of claim 16, wherein the gasket is a tape.

* * * * *